(12) United States Patent
Johnson

(10) Patent No.: US 6,222,850 B1
(45) Date of Patent: *Apr. 24, 2001

(54) DYNAMIC TRANSMIT TUNING FOR ETHERNET DEVICE DRIVERS

(75) Inventor: Steven Howard Johnson, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/174,401

(22) Filed: Oct. 14, 1998

Related U.S. Application Data (63) Continuation of application No. 08/670,310, filed on Jun. 27, 1996, now Pat. No. 5,864,558.

(51) Int. Cl.$^7$ ................................................. H04L 12/413
(52) U.S. Cl. ............................................................. 370/445
(58) Field of Search ..................................... 370/230, 229, 370/235, 238, 255, 257, 282, 294, 445, 446, 447, 448, 461, 462

(56) References Cited

U.S. PATENT DOCUMENTS

| | | |
|---|---|---|
| 5,305,317 | 4/1994 | Szczepanek . |
| 5,404,353 * | 4/1995 | Ben-Michael et al. ............... 370/235 |
| 5,432,775 | 7/1995 | Crayford . |
| 5,548,796 * | 8/1996 | Ketchum .............................. 395/872 |
| 5,642,360 | 6/1997 | Trainin ................................. 370/230 |

FOREIGN PATENT DOCUMENTS 0 632 620   4/1995   (EP) .

OTHER PUBLICATIONS

"Solving Capture in Switched Two-Node Ethernets by Changing Only One Node" by Wayne Hayes, University of Toronto and Mart L. Molle, University of California, 1995 IEEE pp. 387–395.

* cited by examiner

Primary Examiner—Ajit Patel
(74) Attorney, Agent, or Firm—Joscelyn G. Cockburn (57) ABSTRACT

A LAN of the ethernet type employs CSMA/CD protocol for channel access by a plurality of network nodes. Each node includes a data processing system having a device driver and an adapter and transmits data packets to the LAN in accordance with the IEEE 802.3 standard. The adapter coupled is at one side to the network in either a half or full-duplex mode. The other side of the adapter is bound to the device driver which is dynamically tuned for reduced latency and increased network throughput, regardless of the transmitting mode of the node and the capture effect of the ethernet. Each device driver operates in a transmit chaining mode when the network is in a lightly loaded half-duplex, or full-duplex mode. The driver includes means for monitoring data packet collisions on a channel of the network. A "collision rate" or the percentage of data packets which were transmitted on the channel with collisions in a pre-selected time interval is calculated by the device driver. A "collision threshold" is assigned or calculated by the device driver. Data packets transmitted by each device driver are chained to increase network throughput when the "collision rate" is below the "collision threshold". Transmit chaining of data packets is disabled for the device driver when the "collision threshold" is exceeded on the channel.

21 Claims, 5 Drawing Sheets

DYNAMIC TRANSMIT TUNING FOR ETHERNET DEVICE DRIVERS

Continuation of prior application Ser. No. 08/670,310 filed Jun. 27, 1996 now U.S. Pat. No. 5,864,558.

BACKGROUND OF THE INVENTION

1. Field of the Invention

This invention relates to communication networks. More specifically, the invention relates to Local Area Networks (LANs) of the Carrier Sense Multiple Access with Collision Detection (CSMA/CD) type which provide both half-duplex and full-duplex communication channels.

2. Description of the Prior Art

Ethernet is a commonly used name for a network access protocol of the CSMA/CD type. The CSMA/CD protocol is defined in ANSI/IEEE Standard 802.3, published by the Institute of Electrical and Electronic Engineers, Inc., 3445 East 45th Street, New York, N.Y. 10017, and referred to as the IEEE 802.3 standard. Under the CSMA/CD rules for access to a network, any node or station wishing to transmit must first "listen" to make sure that the channel is clear before beginning to transmit. All nodes on the network have equal priority of access and after a required inter-packet delay (IPG) of 9.6 μs (microseconds) may begin transmitting as soon as the channel is clear. However, if the first node that has started transmitting detects a "collision" with a transmission from another node, the first node continues transmitting for a short time to make sure that all nodes wishing to transmit will detect the collision. Every other node detecting collision also continues to transmit for a short time. Then each node that has detected a collision terminates transmission of the packet or frame. The nodes involved in the collision enter a collision avoidance mode. In the collision avoidance mode, the nodes wait for the required IPG of 9.6 μs and then use different delay times, referred to as backoff times, before trying transmission of the same packet again. When the number of nodes is small, e.g. two nodes, the IEEE standard 802.3 exhibits an undesirable effect, referred to as the "capture effect" in which one of the nodes may effectively capture and transmit a succession of data packets which essentially "freezes out" the other node from transmitting messages.

The nature of ethernet is changing in that there are now multiple methods of connecting to a network. Ethernet can be connected in half-duplex, half-duplex switched or full-duplex switched domains. Each of these environments has characteristics that define the highest performing method of transmitting data on the network. When the network hardware is programmed to operate half-duplex, which is the standard node for ethernet, chaining transmit packets together can result in poor network performance due to the speeds at which some signal drivers can drive the network, particularly when the network is in a high traffic collision domain. In a lightly loaded half-duplex network, however, there is less need to incur artificially extended inter-packet delay between packets or frames, since the level of competition for the network is greatly reduced. On the other hand, in full-duplex, it is not necessary to incur an artificially extended inter-packet delay since the station is no longer competing for access to the network. Therefore, in full-duplex it is more beneficial not to incur the overhead of artificially extended inter-packet delay between packets, since there is no competition for the network.

Accordingly, there is a need to provide an ethernet driver transmit technique for both half and full-duplex that maximizes performance of the network in terms of latency and throughput, regardless of whether half or full-duplex is being used on the network.

The prior art related to the problem addressed by the present invention is, as follows:

European patent application 063,262,082 entitled "Backoff Time Evaluation Method for ethernet," published Apr. 1, 1995, discloses an ethernet capture effect avoidance scheme which uses a special capture avoidance binary exponential backoff (CABEB) algorithm.

A publication entitled "Solving Capture in Switched Two-Node Ethernets By Changing Only One Node" by W. Hayes, et al. published in the proceedings, Twentieth Conference on Local Computer Networks, Minneapolis, Minn., USA, Oct. 16–19, 1995, pages 387–95, discloses a method for solving capture effect in switched multi-mode ethernet systems by allowing a node to keep a local copy of attempts counter of other nodes and to use this information to trigger switching its medium access protocol policy between two extremes, one aggressively persistent and the other completely passive.

U.S. Pat. No. 5,432,775 entitled "Auto Negotiation System for a Communication Network," issued Jul. 11, 1995, filed Dec. 3, 1993, discloses a system for detection of enhanced capability of stations on a communications network. A specified pattern of late test pulses are detected and transmitted to provide for the indication of enhanced capability. The system is particularly useful for determining whether a particular station is in full-duplex or half-duplex mode without affecting overall network performance.

U.S. Pat. No. 5,305,317 issued Apr. 19, 1994, discloses an adaptive circuit for a local area network whereby the adaptive circuit can operate in a token ring protocol or in an ethernet protocol. A protocol handler is operable to communicate with internal buses in either a token ring or ethernet protocol.

None of the prior art addresses the problem of dynamically tuning ethernet device drivers for improved network performance, i.e., latency and throughput, regardless of whether the network hardware is in a half or full-duplex mode, and without the use of special algorithms or other mechanisms to alter the inter-packet delay gap for collision avoidance.

SUMMARY OF THE INVENTION

An object of the invention is an improved local area network (LAN) of the ethernet type operating in either a half or full-duplex mode with improved latency and throughput.

Another object is a LAN of the ethernet type employing transmit chaining in half or full duplex mode without involving a "capture" problem or mode testing.

Another object is a tunable device driver for a LAN of the ethernet type which provides improved performance for either a half-duplex or full-duplex environment.

Another object is a method to dynamically throttle back a device driver in a communications network to reduce the number of collisions when the driver detects the network is heavily utilized in a half duplex mode, yet provide the maximum throughput when the network is lightly loaded in a half duplex mode or in a full duplex mode.

Another object is a method of increasing throughput on a LAN of the ethernet type when operated in a lightly loaded half-duplex or a full-duplex mode.

Another object is a method to avoid a capture effect in a LAN of the ethernet type operating in a half-duplex mode using the IEEE 802.3 standard for collision backoff procedure.

These and other objects, features and advantages are achieved in a LAN of the ethernet type employing CSMA/CD protocol for channel access by a plurality of network nodes. Each node transmits data packets to the LAN in accordance with the IEEE 802.3 standard. Each node includes an adapter coupled at one side to the network in either a half or full-duplex mode. The other side of the adapter is bound to a device driver which is dynamically tuned for reduced latency and increased network throughput, regardless of the transmitting mode of the node and the capture effect of an ethernet LAN. Each device driver operates in a transmit chaining mode when the network is in a lightly loaded half-duplex, or full-duplex mode. The driver includes means for monitoring data packet collisions on a channel. A "collision rate" or the percentage of data packets which were transmitted on the channel with collisions in a pre-selected time interval is calculated by the device driver. A "collision threshold" is assigned or calculated by the device driver. Data packets transmitted by each device driver are chained to increase network throughput when the "collision rate" is below the "collision threshold". Transmit chaining of data packets is disabled for the device driver when the "collision threshold" is exceeded on the channel.

In summary, the present invention satisfies the need for a communication network of the ethernet type for improved latency and throughput by dynamically tuning device drivers according to a "collision rate" and "collision threshold". The device driver is tuned by calculating or assigning a "collision rate" and determining whether the "collision rate" exceeds the assigned or calculated "collision threshold." When the "collision rate" does not exceed the "collision threshold" the LAN hardware or adapter performs transmit chaining which improves latency and increases network throughput, regardless of whether the hardware is in a half or full-duplex mode and without testing to determine the mode or duplex status of the channel. When the "collision rate" is exceeded, the device driver artificially extends the IPG by transmitting data packets one at a time which tends to avoid the capture effect problem of ethernet LANS.

DESCRIPTION OF A PREFERRED EMBODIMENT

Figure 1:
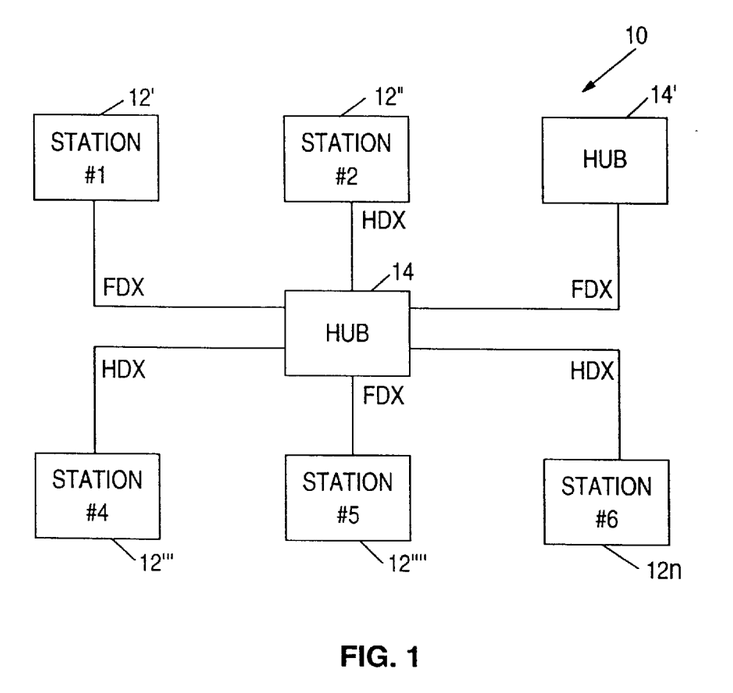
FIG. 1 is a representation of a communications network of the ethernet type having a plurality of stations using a half or full-duplex mode for communications with other stations.

In FIG. 1, a communications network 10 of the ethernet type includes a plurality of stations or nodes 12' . . . 12n coupled to a hub 14 in a half-duplex (HDX) or full-duplex (FDX) mode with the FDX mode being implemented in the hub. The network operates in the CSMA/CD mode as described in IEEE standard 802.3 with collision avoidance.

The text "Ethernet—Building a Communications Infrastructure" by H. Hegering et al, published by Addison-Wesley Publishing Company, Wokingham, England, 1993 (ISBN: 0-201-62405-2), pages 12, 33 provides additional details on an ethernet and the full text is incorporated by reference into the present application.

Figure 2:
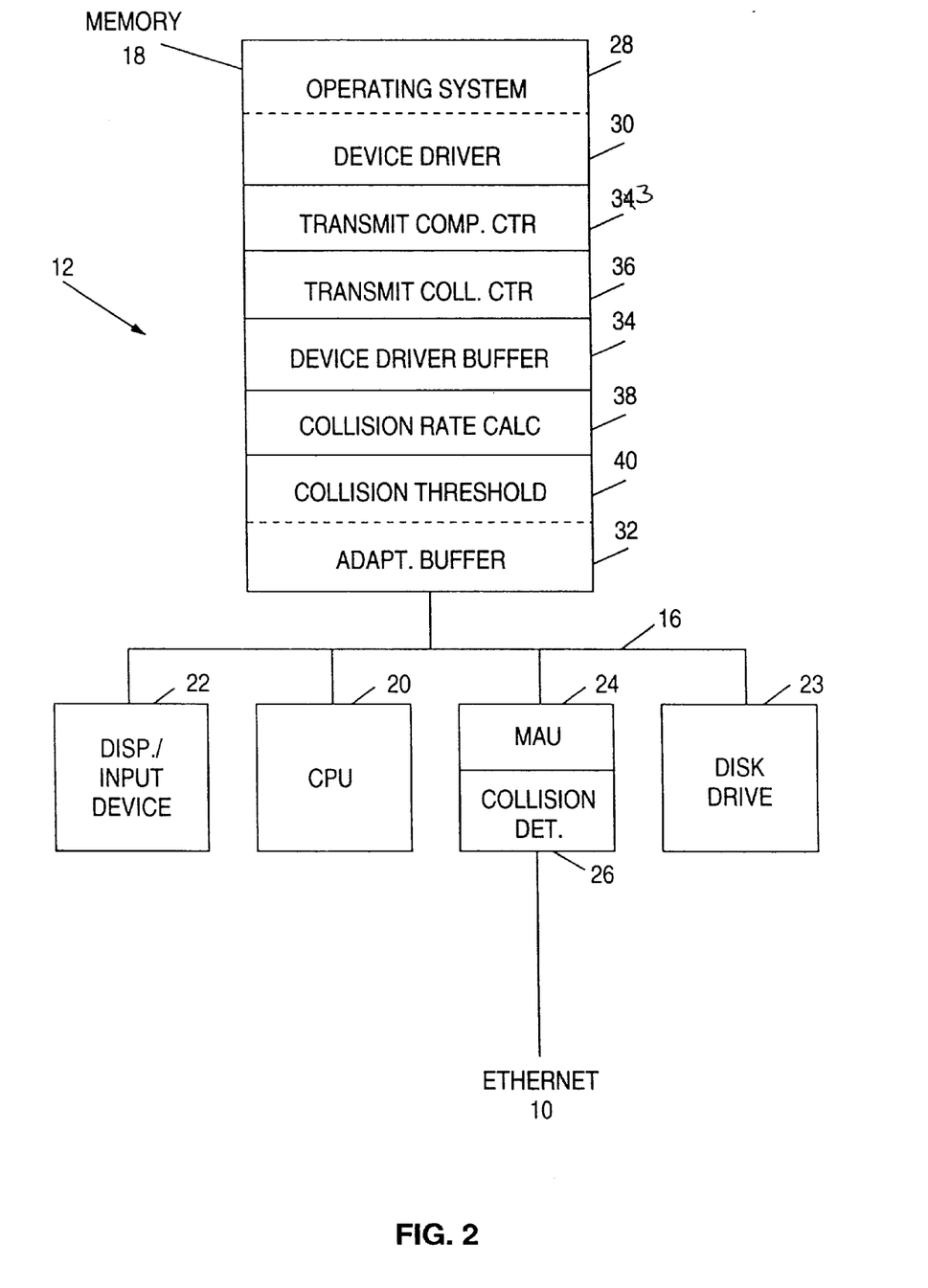
FIG. 2 is a representation of a station or node in the network of FIG. 1 which incorporates the principles of the present invention.

In FIG. 2, a representative station or node 12 in the network includes an input/output (I/O) bus 16 coupled to a conventional memory 18, central processing unit 20, display/input device 22 and a disk storage device 23 which accepts a computer usable medium e.g. a floppy disk or mini embodying stored computer program instructions for entry into or down loading from the memory 18. Also connected to the I/O bus 16 is one side of an adapter 24, typically a Medium Access Unit (MAU), described in the text by H. Hegering et al supra and including a collision detection function 26. The other side of the adapter is connected to the ethernet 10.

The memory 18 includes a series of stored program instructions including a conventional operating system 28, e.g OS/2, Windows 95, UNIX, etc; a device driver 30 and an adapter buffer 32. The device driver provides instructions for reformatting or interpreting software command for transfer to and from peripheral devices and the CPU 20. The device driver manages a device driver buffer 34 for storing data frames sent by the operating system 28 to the adapter 24 when the station is in a collision avoidance mode. The adapter buffer stores frames sent by the device driver for transmission to the network 10 when the station is not in a collision avoidance mode.

The device driver monitors a transmit complete counter 33 and a transit collision counter 36 to calculate a collision rate occurring on the network 10 in a specified time period, as will be described hereinafter. The device driver employs a collision rate calculating algorithm 38 stored in the memory 18 for such purpose. Lastly, a collision threshold 40 is stored in the memory 18 for use in the exercise of the calculating algorithm 38. The threshold 40 may be arbitrarily selected by a user based on network collision experience or dynamically calculated based on the type of network, i.e. full or half-duplex; number of stations or nodes; lightly or heavily loaded traffic on the network, and other network parameters having a bearing on the probability of collisions occurring on the network. The collision threshold 40 would be reset in the memory, as required after the dynamic calculation of the threshold.

A brief overview of the invention will be provided before describing the flow diagrams of FIGS. 4A, B and C., as follows:

In FIGS. 1 and 2, each device driver 30 in the network monitors the number of frames that are transmitted using the transit collision counter and collision detector 26, with collisions indicating network competition among the transmitting stations or nodes 12. The more collisions detected by a node, the more competition, and therefore, the device driver should transmit frames one at a time in accordance with the IEEE 802.3 backoff procedure. Conversely, the fewer collisions detected, the less competition, and therefore, the device should chain transmit packets together regardless of half or full-duplex mode.

Once per second the device driver calculates the percentage of frames that were transmitted with collisions over a defined time interval, typically four seconds. Transmit chaining is enabled as long as this number is below a certain percentage or collision threshold, typically in the range of ten percent, but this percentage may be dynamically changed according to the network status. Once the collision threshold is exceeded, transmit chaining is disabled which occurs only for a half-duplex mode when in a high network traffic/high collision rate status. Full-duplex mode is not subject to the collision threshold since each node transmits and receives messages directly from other nodes without competition from the circuit. Accordingly, there is no need for the channel to be tested to determine the transmit mode or duplex status in which the channel is operating.

To implement the calculation of a collision rate, a "transmit complete" counter 33 is incremented every time a frame completes transmission from the node. Every time a frame completes transmission with collisions indicated, a "transmit complete with collision" counter 36 is incremented. These counters are maintained in such a way as to indicate the current state of the network over the past four seconds, so as not to be affected by bursts of activity. A decision is made periodically by the device driver taking the ratio of the two counters. If more than the threshold value of collisions to the total frames is reached, new frames will be enqueued on the pending queue in buffer 34 of the device driver. Otherwise, new frames will be enqueued on the "ready" queue in the buffer 32 of the adapter. The decision for enqueuing the packets at the device driver or the adapter is based upon the following equation:

$$\text{if} \frac{\text{transmit collision counter} \times 100}{\text{transmit complete counter then enqueued pending} = \text{TRUE}} \geq$$
$$\text{else enqueued pending} = \text{FALSE}$$
$$\text{threshold value}$$

Figure 3:
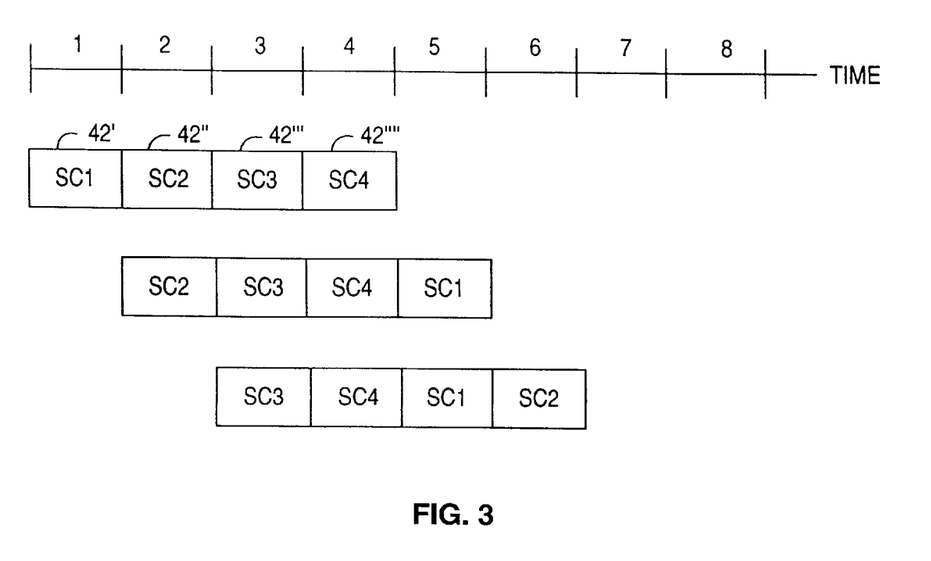
FIG. 3 is a representation of a counter included in the station of FIG. 2 and used in the method of FIG. 4C.

In FIG. 3, each counter covers only the past "4" seconds. The counts maintained are only the number of occurrences within that time period. In implementations, there are four subcounters 42', 42", 42'" and 42"" maintained, the counter value being the sum of the occurrences for the four subcounters. Thus, in the first calculation, the counter value is the sum of the counts for the time periods 1, 2, 3 and 4 which occurs at time period 4. In the next calculation, which occurs in time period 1, the counter value is the sum of the counts for time periods 2, 3, 4 and 5. In the next calculation which occurs in time period 2, the counter value is the average of the counts for time periods 3, 4, 5 and 6, and so forth. After each count calculation, the oldest count is cleared from the subcounter to begin counting new frames. Each counter, therefore, is the sum of the four subcounters over a four second period.

Figure 4A:
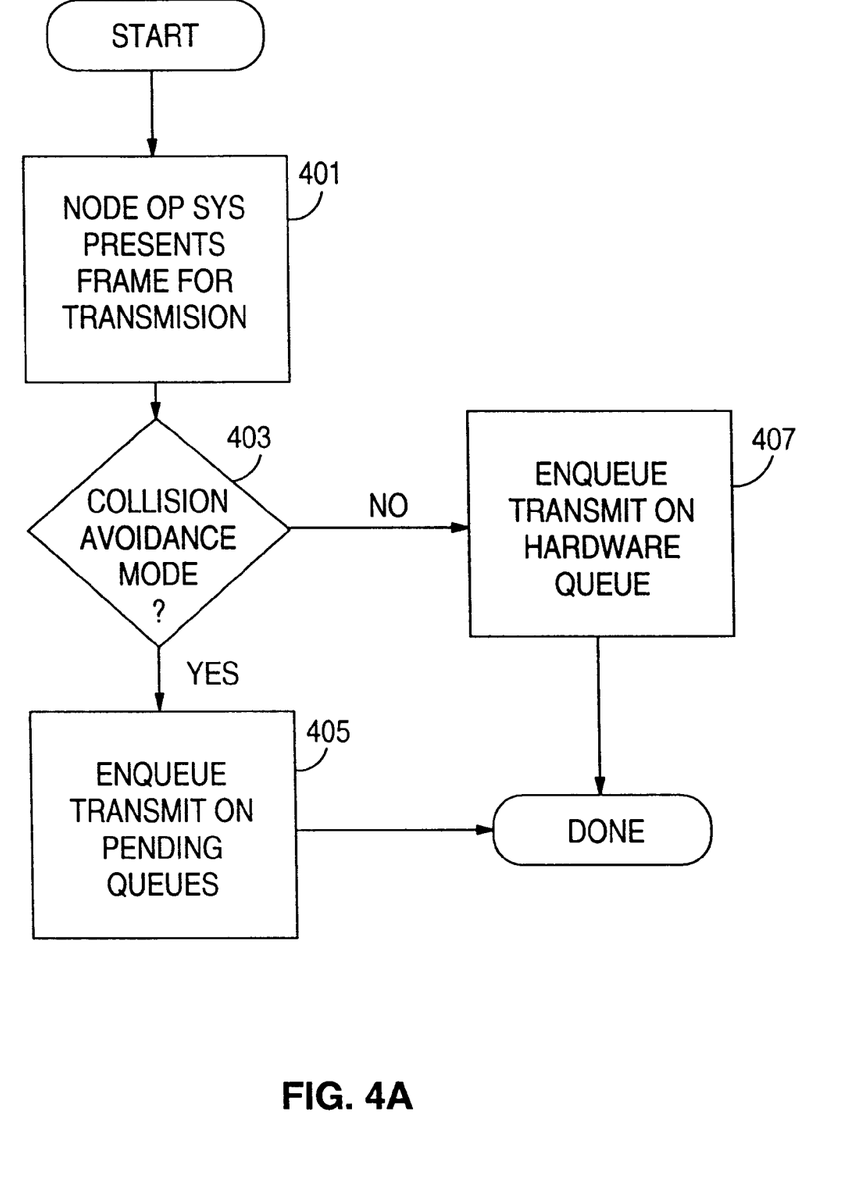
FIG. 4A is a flow diagram which implements the method of the present invention in transmitting data frames from a station to the network.
Figure 4B:
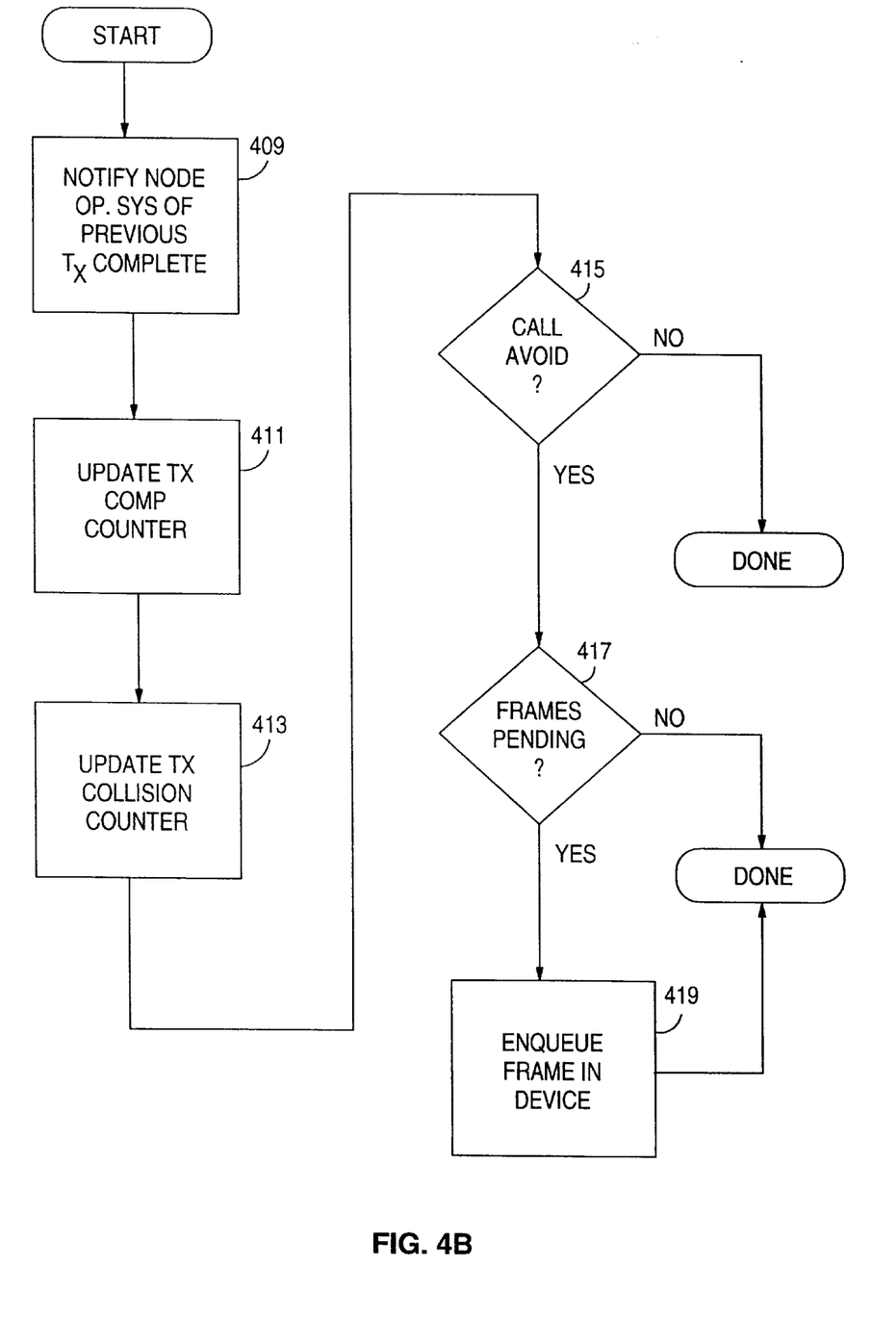
FIG. 4B is a flow diagram which describes the operation of transmit complete for the station of FIG. 2.
Figure 4C:
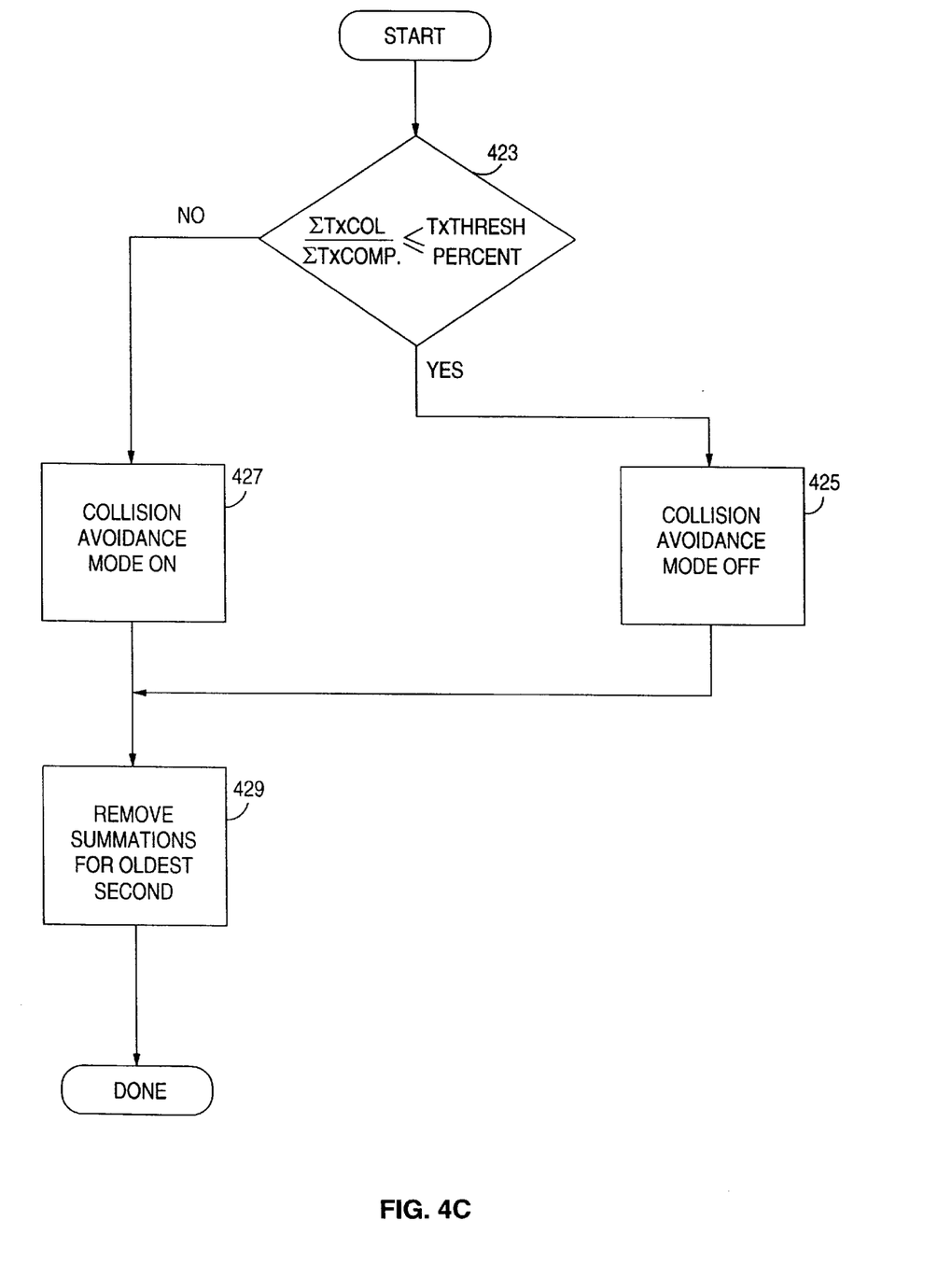
FIG. 4C is a flow diagram for calculating a "collision rate" for the method of the present invention.

In FIG. 4A, a process will be described for transmitting a frame from the node to the network. The process is entered in a step 401 when the operating system 28 presents a frame to the device driver 30 for transmission to the network using the CSMA/CD procedure of IEEE 802.3. In step 403 the driver performs a collision avoidance mode test and a "yes" condition enqueues the frame in the device driver buffer 34 and the process ends. Additional frames are enqueued in the device driver buffer in a step 405 until the collision avoidance mode test indicates a "no" condition. When a "no" condition results from the test of step 403, all pending frames are moved to the adapter 24 the new frame is enqueued in the adapter buffer 32 in step 407 whereupon the process ends.

In FIG. 4B, a process will be described for the device driver during the interrupt time on the network after a transmit complete has been indicated for a transmitted frame. The process is entered in a step 409 when the device driver notifies the operating system of a transmit complete. In a step 411, the device driver updates the transmit complete counter 34. Next, in a step 413 the device driver updates the transmit collision counter 36. In a step 415, the device driver checks if it is in collision avoid mode. A "no" condition ends the process. A "yes" condition will cause the device driver to interrogate the operating system for frames pending in a step 417. A "no" condition ends the process. A "yes" condition enqueues the next pending frame in the adapter buffer in a step 419, after which the process ends.

In FIG. 4C, a process will be described for the device driver in calculating at each second of the network clock a collision rate for the network to determine if the device driver should enter a collision avoidance mode and wait to transmit the next frame. The process is entered in a step 423 performed by the device driver in which the sum of the transmit collision subcounters is divided by the sum of the transmit complete subcounters and the result compared to the collision threshold. If the collision threshold is greater than the results of the division, a "yes" condition initiates a "collision avoidance mode off" condition for the device driver in a step 425. If the collision threshold is less than the results of the division, a "no" condition initiates a "collision avoidance mode on" condition for the device driver in a step 427. After determination of the collision avoidance mode for the device driver, the oldest count is cleared from the transmit complete and transmit collision counters in a step 429, after which the process ends.

Summarizing, a device driver performs transmit chaining in an ethernet in either a half or full-duplex mode without testing the network to determine which mode exists. When the network is in a half-duplex mode and collisions occur which exceed a collision threshold, the node enters a collision avoidance mode which minimizes the probability of a capture effect from occurring on the network. When in a collision avoidance mode, the device driver stores frames in a device driver buffer, otherwise the device driver performs transmit chaining which improves latency and throughput on the network. Stated another way, the device driver is dynamically tuned to the network for transmit chaining according to a comparison of an assigned or dynamically calculated collision threshold to the ratio of a transmit complete counter and a transmit collision counter.

While the invention has been described with respect to a specific embodiment it is apparent that various changes and modifications may be to the embodiment without departing from the spirit and scope of the invention as described in the appended claims.

I claim:

1. In a network employing Carrier Sense Multiple Access with Collision Detection (CSMA/CD) protocol for channel access wherein there is a plurality of network nodes and wherein a plurality of data packets is transmitted through a network channel by the nodes, each node including a data processing system having a device driver and an adapter, apparatus for dynamically tuning device drivers in at least one node in full or half-duplex environments for balanced network access by the nodes, comprising:

a) means for monitoring data packet collisions on the channel;

b) means for calculating a collision rate or the percentage of data packets which were transmitted on the channel with collisions occurring in a preselected time interval;

c) means for establishing a collision threshold for each node;

d) means for chaining data packets transmitted from the node by a device driver when the collision rate is below the collision threshold regardless of whether the network is in a half or full-duplex environment; and d) means for disabling chaining of data packets when the collision threshold is exceeded on the channel.

2. The apparatus of claim 1 further including a transmit complete counter for summing data packets transmitted by the node without a collision occurring between a transmitted data packet and other data packets on the network.

3. The apparatus of claim 2 further including a transmit collision counter for summing data packets transmitted by the node where a collision occurs between a transmitted data packet and other data packets on the network.

4. The apparatus of claim 3 wherein the transmit complete and transmit collision counters record in a preselected time period each transmit complete and transmit collision occurring for data packets transmitted by the node.

5. The apparatus of claim 3 wherein each counter comprises a plurality of sections, one counter section recording the transmit complete and the other counter section recording the transmit collisions occurring in the preselected time period.

6. The apparatus of claim 5 wherein each counter sums the recorded event in a multiple of preselected time periods and stores the sum for use in calculating a collision rate occurring on the channel for the node.

7. The apparatus of claim 1 wherein the network is a Local Area Network of the ethernet type, each node employing transmit data packet chaining in a half or full duplex mode without involving a "capture" problem.

8. The apparatus of claim 7 wherein transmit data packet chaining occurs in a lightly loaded half duplex or full duplex mode.

9. The apparatus of claim 8 wherein single data packet transmissions occur from a transmitting node when the threshold value has been exceeded and the node is in a collision avoidance mode.

10. In a network employing Carrier Sense Multiple Access with Collision Detection (CSMA/CD) protocol for channel access wherein there is a plurality of network nodes, each node including a data processing system having a device driver and an adapter and transmitting a plurality of data packets through a network channel, a method for dynamically tuning the device driver operation in full or half-duplex environments for balanced network access by the nodes, comprising the steps of:

a) monitoring data packet collisions on the channel for data packets transmitted by a node;

b) calculating for the node a collision rate on the channel or the percentage of data packets which were transmitted on the channel by the node with collisions occurring in a preselected time interval;

c) establishing a collision threshold for a node;

d) chaining data packets transmitted on the channel by a device driver for the node when the collision rate on the channel is below the collision threshold regardless of whether the network is in a half or full-duplex environment; and e) disabling chaining of data packets by the device driver when the collision threshold is exceeded on the channel.

11. The method of claim 10 further including the step of using a transmit complete counter for summing data packets transmitted by the node without a collision occurring between a transmitted data packet and other data packets on the network.

12. The method of claim 11 further including the step of using a transmit collision counter for summing data packets transmitted by the node where a collision occurs between a transmitted data packet and other data packets on the network.

13. The method of claim 12 further including the step of recording in the transmit complete and transmit collision counters in a preselected time period each transmit complete and transmit collision occurring for data packets transmitted by the node.

14. The method of claim 13 wherein each counter comprises a plurality of sections, one counter section recording the transmit completes and the other counter section recording the transmit collisions occurring in the preselected time period.

15. The method of claim 14 further including the step of summing in each counter the recorded event in a multiple of preselected time periods and storing the sum in a memory for use in calculating the collision rate occurring on the channel for the node.

16. An article of manufacture comprising:

a) a computer usuable medium having computer readable program code means embodied therein for monitoring and controlling a Local Area Network (LAN) of the ethernet type for data packet chaining in at least one node of the LAN operating in a half duplex or full duplex mode without involving a "capture" problem, the node including a computer system having a device driver and adapter, the computer readable program code means in said article of manufacture comprising:

b) computer readable program code means for monitoring data packet collisions occurring on a channel in the network;

c) computer readable program code for calculating at the node a collision rate on the channel or the percentage of data packets which were transmitted on the channel by the node with collisions occurring in a preselected time interval;

d) computer readable program code for establishing a collision threshold for the node;

e) computer readable program code for chaining data packets transmitted on the channel by the device driver for the node when the collision rate on the channel is below the collision threshold regardless of whether the network is in a half or full-duplex environment; and f) computer readable program code for disabling chaining of data packets by the device driver when the collision threshold is exceeded on the channel.

17. An article of manufacture for use in at least one node of a Local Area Network of the ethernet type, said node including a computer with an adapter, said article of manufacture including:

a) a computer usable medium having thereon;

b) computer readable program code for monitoring data packet collisions occurring on a channel in the network;

c) computer readable program code for calculating at the node a collision rate on the channel or the percentage of data packets which were transmitted on the channel by the node with collisions occurring in a preselected time interval;

d) computer readable program code for establishing a collision threshold for the node;

e) computer readable program code for chaining data packets transmitted on the channel by the device driver for the node when the collision rate on the channel is below the collision threshold regardless of whether the network is in a half or full-duplex environment; and f) computer readable program code for disabling chaining of data packets by the device driver when the collision threshold is exceeded on the channel.

18. The article of manufacture set forth in claim 17 further including a computer readable program code for providing instructions that reformat or interpret software commands for transfer to and from the adapter.

19. An apparatus comprising:

a controller that determines a collision threshold in a node of a communications network;

a controller that calculates collision rate or the percentage of data packets transmitted on a channel coupled to said node and colliding with other data packets in a preselected time interval;

a controller that chains data packets transmitted from the node by a device driver, if the collision rate is below the collision threshold; and a controller that disables chaining of data packets if the collision threshold is exceeded.

20. The apparatus of claim 19 further including a software driver coupled to the controller.

21. A method comprising the steps of:

establishing a collision threshold in a node of a communications network;

calculating collision rate or the percentage of data packets transmitted on a channel coupled to said node with collisions occurring with other data packets in a preselected time interval;

chaining data packets transmitted from the node by a device driver, if the collision rate is below the collision threshold; and disabling chaining of data packets if the collision threshold is exceeded.

\* \* \* \* \*